United States Patent
Chen

(10) Patent No.: US 8,039,999 B2
(45) Date of Patent: Oct. 18, 2011

(54) HEAT DISSIPATION STRUCTURE FOR SEALED MACHINE TOOLS

(76) Inventor: Bach Pangho Chen, Claremont, CA (US)

( * ) Notice: Subject to any disclaimer, the term of this patent is extended or adjusted under 35 U.S.C. 154(b) by 201 days.

(21) Appl. No.: 12/492,157

(22) Filed: Jun. 26, 2009

(65) Prior Publication Data

US 2010/0327675 A1    Dec. 30, 2010

(51) Int. Cl.
*H02K 7/14* (2006.01)
*H02K 9/00* (2006.01)

(52) U.S. Cl. .......... 310/47; 310/50; 310/59; 310/60 R; 310/67 R

(58) Field of Classification Search ........... 310/60 R, 310/60 A, 67 R, 47, 50, 52–64; 417/366; H02K 9/02
See application file for complete search history.

(56) References Cited

U.S. PATENT DOCUMENTS

| | | | |
|---|---|---|---|
| 2,768,583 A * | 10/1956 | Richard et al. | 417/354 |
| 3,227,902 A * | 1/1966 | Laing | 310/59 |
| 4,128,778 A * | 12/1978 | Merkle et al. | 310/67 R |
| 5,982,064 A * | 11/1999 | Umeda et al. | 310/90 |
| 6,144,121 A * | 11/2000 | Ishida et al. | 310/50 |
| 6,384,494 B1 * | 5/2002 | Avidano et al. | 310/58 |
| 6,744,157 B2 * | 6/2004 | Choi et al. | 310/62 |
| 6,789,630 B2 | 9/2004 | Baker et al. | |
| 6,798,098 B1 * | 9/2004 | Tai | 310/67 R |
| 6,914,355 B2 * | 7/2005 | Cardenas et al. | 310/58 |
| 7,034,416 B2 * | 4/2006 | Simofi-Ilyes et al. | 310/58 |
| 7,122,923 B2 * | 10/2006 | Lafontaine et al. | 310/58 |
| 7,157,818 B2 * | 1/2007 | Jones | 310/63 |
| 7,166,939 B2 | 1/2007 | Voigt et al. | |
| 7,282,823 B2 * | 10/2007 | Hilton | 310/62 |
| 7,481,617 B2 * | 1/2009 | Hsu et al. | 415/184 |
| 7,701,097 B2 * | 4/2010 | Lan et al. | 310/61 |
| 7,732,955 B2 * | 6/2010 | Miller et al. | 310/63 |
| 2004/0263008 A1 * | 12/2004 | Voigt et al. | 310/58 |
| 2005/0116579 A1 * | 6/2005 | Ohiwa et al. | 310/254 |
| 2006/0013712 A1 * | 1/2006 | Lee et al. | 417/423.7 |
| 2006/0170294 A1 * | 8/2006 | Du | 310/63 |
| 2008/0233848 A1 | 9/2008 | Nordstrom | |

FOREIGN PATENT DOCUMENTS

| TW | M263204 | 5/2005 |
|---|---|---|
| TW | M269645 | 7/2005 |

* cited by examiner

*Primary Examiner* — Quyen Leung
*Assistant Examiner* — Thomas Truong
(74) *Attorney, Agent, or Firm* — Muncy, Geissler, Olds & Lowe, PLLC

(57) ABSTRACT

A heat dissipation structure for sealed machine tools includes a motor rotor rotating to drive airflow to perform heat dissipation simultaneously. It includes a machine tool housing with a heat dissipation vent and a chamber inside, a stator in the chamber and a rotor located between the stator and the housing. The rotor and the housing wall form a swirling flow space between them. The rotor and the stator form an axial flow space between them. The swirling flow space and the axial flow space communicate through a radial airflow passage. The rotor has at least one flow directing portion. The rotor rotates relative to the stator. The stator generates thermal airflow which flows from the axial flow space through a radial airflow passage to the swirling flow space. The flow directing portion performs an exchange of cooling air and thermal airflow through the heat dissipation vent.

16 Claims, 5 Drawing Sheets

HEAT DISSIPATION STRUCTURE FOR SEALED MACHINE TOOLS

FIELD OF THE INVENTION

The present invention relates to a heat dissipation structure for sealed machine tools and particularly to a machine tool heat dissipation structure driven by rotation of a motor rotor which simultaneously generates airflow to perform heat dissipation.

BACKGROUND OF THE INVENTION

Since the invention of the electric motor, continuous progress has been made in centuries and results in huge contributions to the welfare of people's lives. Initially, the electric motors were mainly built in larger sizes for industrial purposes. It has since evolved to a smaller size and applied to home appliances and machine tools. With the advance of fabrication materials and technologies, the size of the electric motor has become smaller while applicability has increased significantly.

Nowadays a wide variety of electric motors are available according to structural types. Each type of motor has various application characteristics in terms of size, heat dissipation, torque, rotation speed, material, production cost, control method and the like. As each electric motor is different, it is difficult to assert which one is best. Selecting the optimal one has to take use environments and requirements in account. On the smaller electric motor the most challenging use condition and environment is the one for the machine tools.

The electric motor used on the machine tools has to meet a great demand on all of its characteristics, such as compact size, sufficient torque, high rotation speed and greater durability used for a prolonged period of time. The deficiency of any characteristic mentioned above could cause a dysfunction or damage of the machine tool. Another concern needing to be addressed is accumulated heat generated by the bearing, coil of motor stator and electromagnetism. If not properly done, it could cause the motor to overheat and directly impact operation duration of the machine tool, namely, affect the durability of the machine tool.

The electric motor generally used on the machine tools is a brushed DC motor with a brush and a commutator. It usually is bulky and has a lower efficiency. Sparks are generated between the brush and commutator which results in the wearing of these two elements. They become consumption items and have to be replaced regularly. Therefore the motor for machine tools gradually is displaced by the brushless DC motor of a smaller size and higher efficiency. Its smaller size results in the concentration of heat generated by the motor. The heat tends to accumulate in a sealed housing when it is used, as the brushless DC motor is encased in a machine tool and is difficult to discharge. As a result, overheating could occur to influence machine tool operation. To overcome this problem many heat dissipation structures have been developed. References can be found in U.S. Pat. Nos. 6,789,630 and 7,166,939, U.S. publication No. 2008/0233848, and R.O.C. patent No. M263204. The most commonly used brushless DC motor on machine tools is an inner runner motor. It mainly has a shaft to drive a fan or heat sink attached thereon. When the main motor rotates the fan or the heat sink is driven to rotate simultaneously, and an airflow is generated to perform heat dissipation. There is another technique with a cooling motor equipped with a fan. Whether the main motor rotates or not, the cooling motor continuously operates to perform cooling. However, such an approach has a limited effect when the machine tool is in use for a long duration. The size and elements needed also increase, and fabrication costs and electric power consumption also are higher. The brushless DC motor used on the machine tools generally does not adopt the out runner motor. It also has a cooling problem identical to the inner runner motor. There are also prior techniques about the cooling structure of the out runner motor, such as R.O.C. patent No. M269645. It mainly has an out runner with an air inlet formed thereon. The housing has a corresponding aperture. Airflow is sucked in through the rotation of the out runner and discharged through the aperture to achieve cooling effect. However, the cooling structure of the brushless DC motor with the out runner disturbs airflow merely through an inclined tangent surface on the air inlet of the out runner. It has a limited effect in discharging the accumulated heat in a prolonged use condition. Hence there is still a lot of room for improvement on the brushless DC motor used on the machine tools to solve the problem caused by poor heat dissipation.

SUMMARY OF THE INVENTION

The primary object of the present invention is to solve the problem of overheat occurred to the conventional brushless DC motor used in sealed machine tools by providing a cooling structure to effectively discharge accumulated heat in the motor.

To achieve the foregoing object, the invention includes a machine tool housing with a chamber formed inside and a wall with a heat dissipation vent formed thereon allowing communication between the chamber with the exterior. The chamber holds a stator and a rotor interposed between the stator and the housing. The rotor and the wall of the housing form a swirling flow space between them. The rotor and the stator form an axial flow space between them. The swirling flow space and the axial flow space are bridged by a radial airflow passage to form communication between them. The rotor has an axial flow aperture communicating with the swirling flow space and the axial flow space. The rotor further has a flow directing portion. The rotor rotates relative to the stator. The stator generates thermal airflow flowing radially from the axial flow space through the radial airflow passage to the swirling flow space. The flow directing portion discharges the thermal airflow through the heat dissipation vent to the exterior and also directs external cooling airflow through the axial flow aperture into the axial flow space to form a circulating heat dissipation airflow, thus forming the basic structure of the invention.

By means of the construction set forth above, the invention can provide many benefits over the conventional techniques, notably:

1. The invention has the flow directing portion formed on the rotor in an integrated manner without adding extra elements and assembly or fabrication processes. Total production cost is lower due to no extra cooling structure needed.

2. With the flow directing portion directly formed on the rotor the motor, it can be maintained at the original size and rotate to perform heat dissipation without consuming additional electric power.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
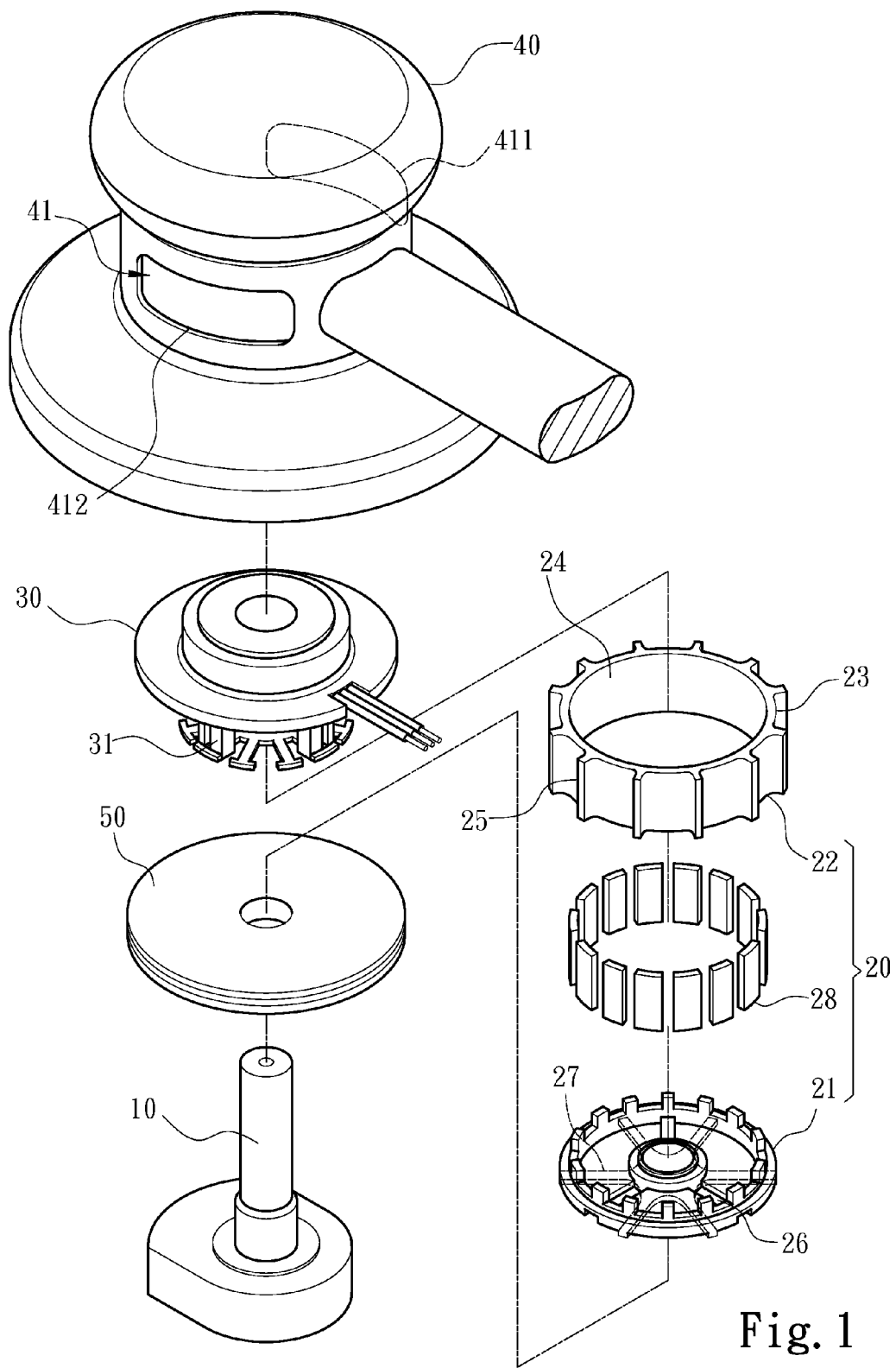
FIG. 1 is an exploded view of the invention.
Figure 2:
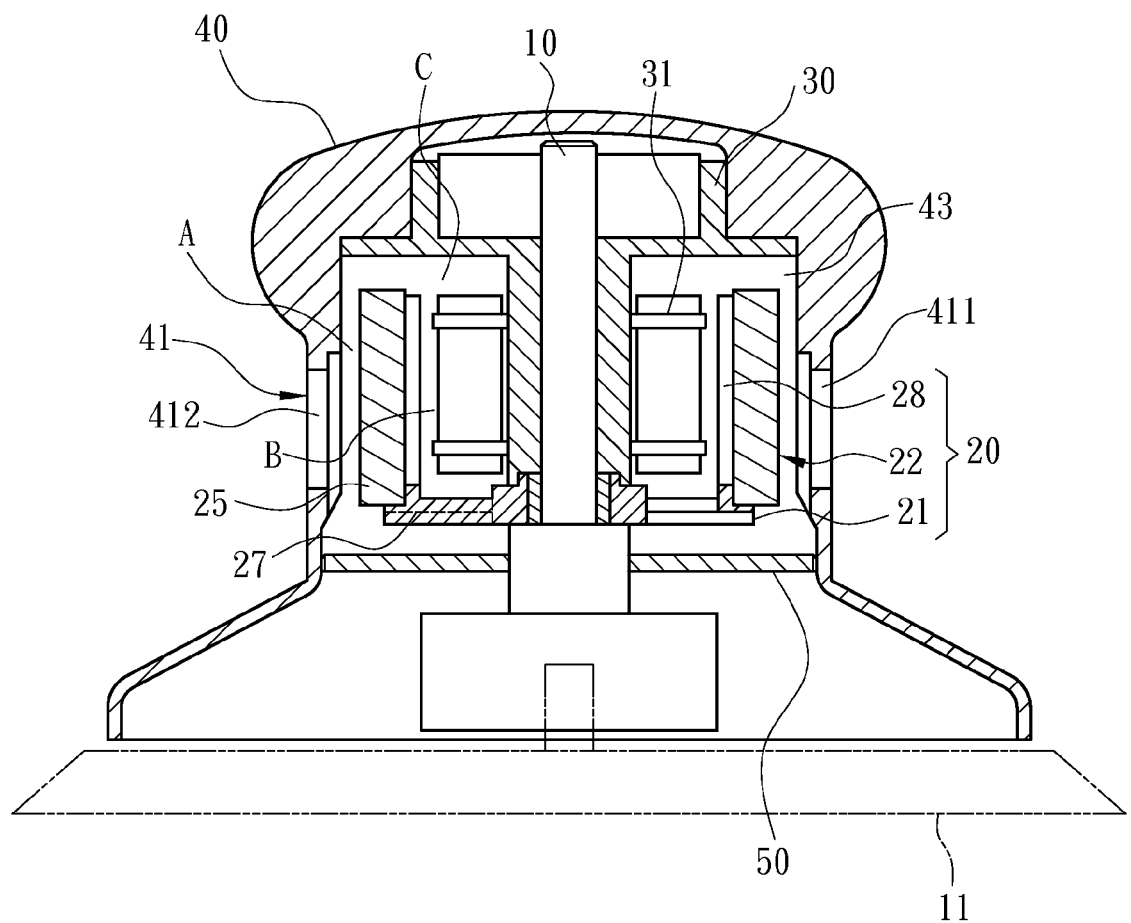
FIG. 2 is a sectional view of the invention.

Please refer to FIGS. 1 and 2. The present invention includes a tool housing 40 which has a chamber 43 inside and at least one heat dissipation vent 41 formed on the wall thereof to communicate the chamber 43 and the exterior of the housing 40. The chamber 43 holds a stator 31 to provide a rotating magnetic field. In an embodiment of the invention, the stator 31 is installed in the chamber 43 and positioned by a stator seat 30. The chamber 43 also holds a rotor 20 between the stator 31 and the housing 40. As shown in the drawings, the rotor 20 is formed in a barrel shape and surrounds the stator 31 in a spaced manner. The rotor 20 and the wall of the housing 40 form a swirling flow space A between them. The rotor 20 and the stator 31 form an axial flow space B between them. The swirling flow space A and the axial flow space B communicate with each other through a radial airflow passage C. The rotor 20 further has an axial flow aperture 26 communicating with the swirling flow space A and the axial flow space B. The rotor 20 has at least one flow directing portion 25 to drive surrounding air to form a swirling flow while the rotor 20 rotates. Thus forms the basic structure of the invention.

In the embodiment set forth above, the stator 31 and the rotor 20 are coupled together on a shaft 10. The shaft 10 has a distal end fastened to a tool set 11. The embodiment shown in the drawings depicts a simple grinding wheel tool to facilitate discussion. But this is not the limitation of the invention. The shaft 10 may also be coupled with the rotor 20 to transmit rotation through a non-coaxial manner. The tool set 11 also is not limited to the grinding wheel. Other tool sets to deploy rotational energy may also be used. The rotor 20 has a base 21 and an annular portion 22. The axial flow aperture 26 is formed on the base 21. The base 21 further has an ancillary flow directing rib 27 to aid channeling of airflow to the axial flow aperture 26. The annular portion 22 has magnetic elements 28 fixedly located on an inner peripheral surface 24 of the rotor 20. To form a sealed space for the chamber 43 to hold the rotor 20 and stator 31 inside, a locking ring 50 is disposed in the housing 40 to isolate the chamber 43 and the exterior to fend off external dust and materials.

Figure 3:
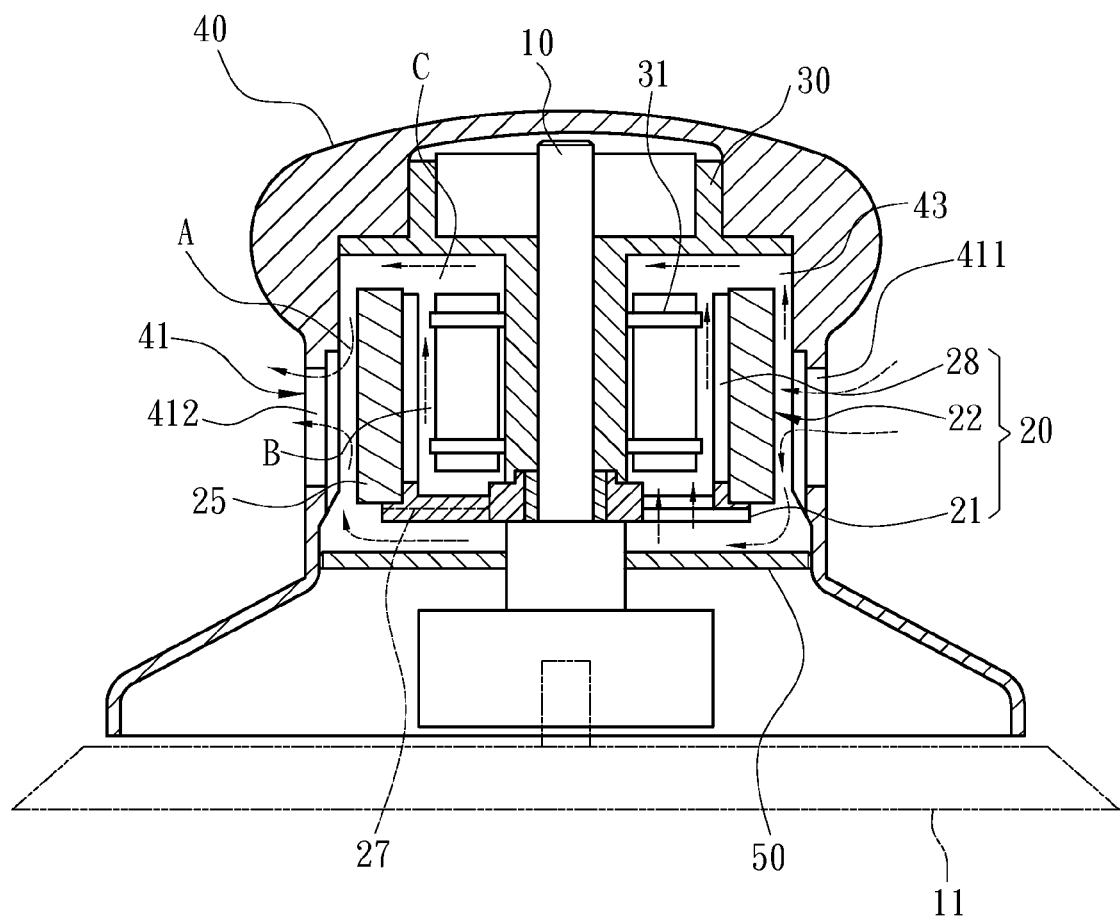
FIG. 3 is a sectional view of the invention schematically showing airflow condition-1.
Figure 4:
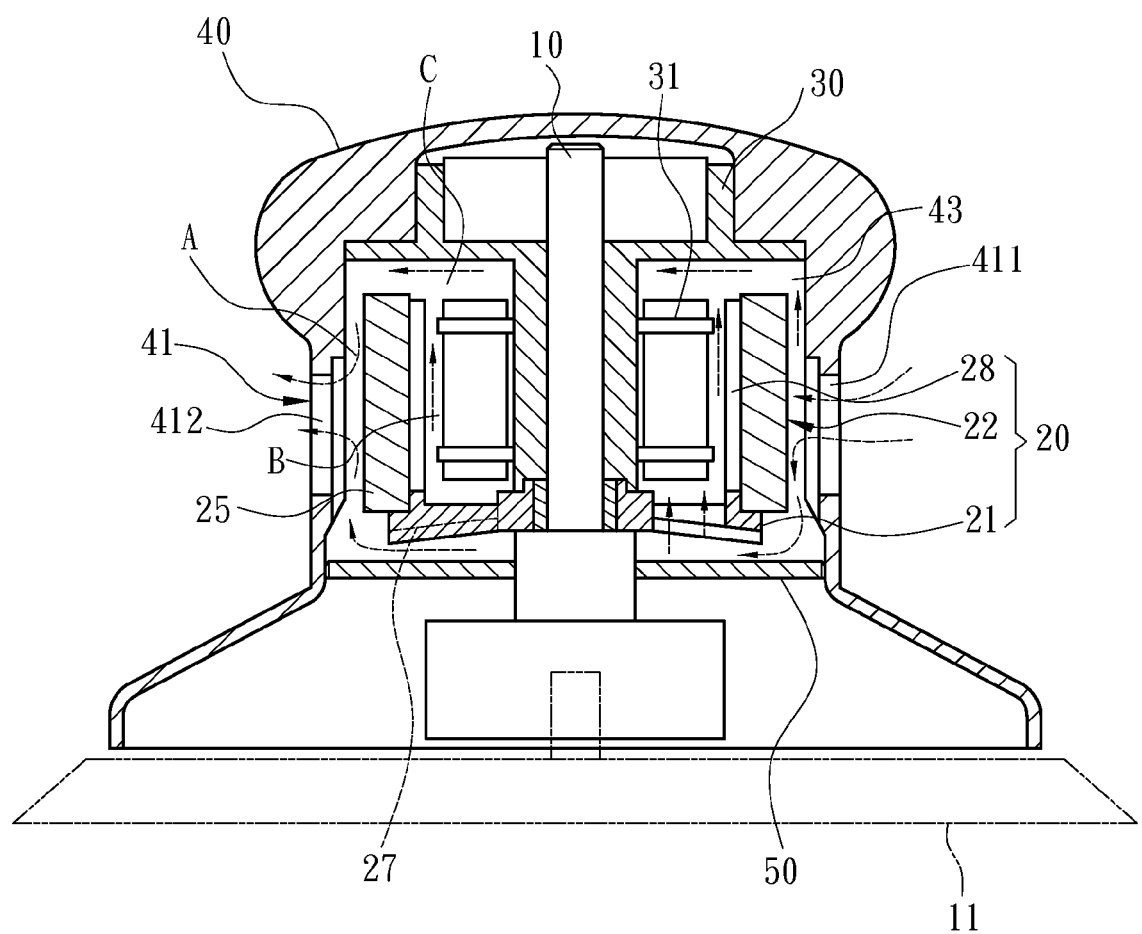
FIG. 4 is a sectional view of the invention schematically showing airflow condition-2.

Also referring to FIG. 3, when in use, the rotor 20 rotates relative to the stator 31. Thermal airflow generated around the stator 31 flows radially from the axial flow space B through the radial airflow passage C to the swirling flow space A. The flow directing portion 25 generates airflow to discharge the thermal airflow through the heat dissipation vent 41 to the exterior and directs external cooling airflow to perform heat exchange between the cooling airflow and the thermal airflow. The drawings also show in and out flow paths of the cooling and thermal airflows. The heat dissipation vent 41 further has an air inlet 411 and an air outlet 412. The positions of the air inlet 411 and the air outlet 412 shown in the drawings serve only for illustrative purposes to facilitate discussion, and are not the limitation of the invention. The heat exchange between the cooling and thermal airflow can take place both in the air inlet 411 and the air outlet 412. Through the drawn cooling airflow passing through the axial flow aperture 26 and entering the axial flow space B, a circulating heat dissipation airflow is formed to achieve heat dissipation effect. Referring to FIG. 4, the base 21 of the rotor 20 may be gradually shrunk in an inclined manner from the perimeter towards the center to enhance flow efficiency of the circulating heat dissipation airflow.

Figure 5:
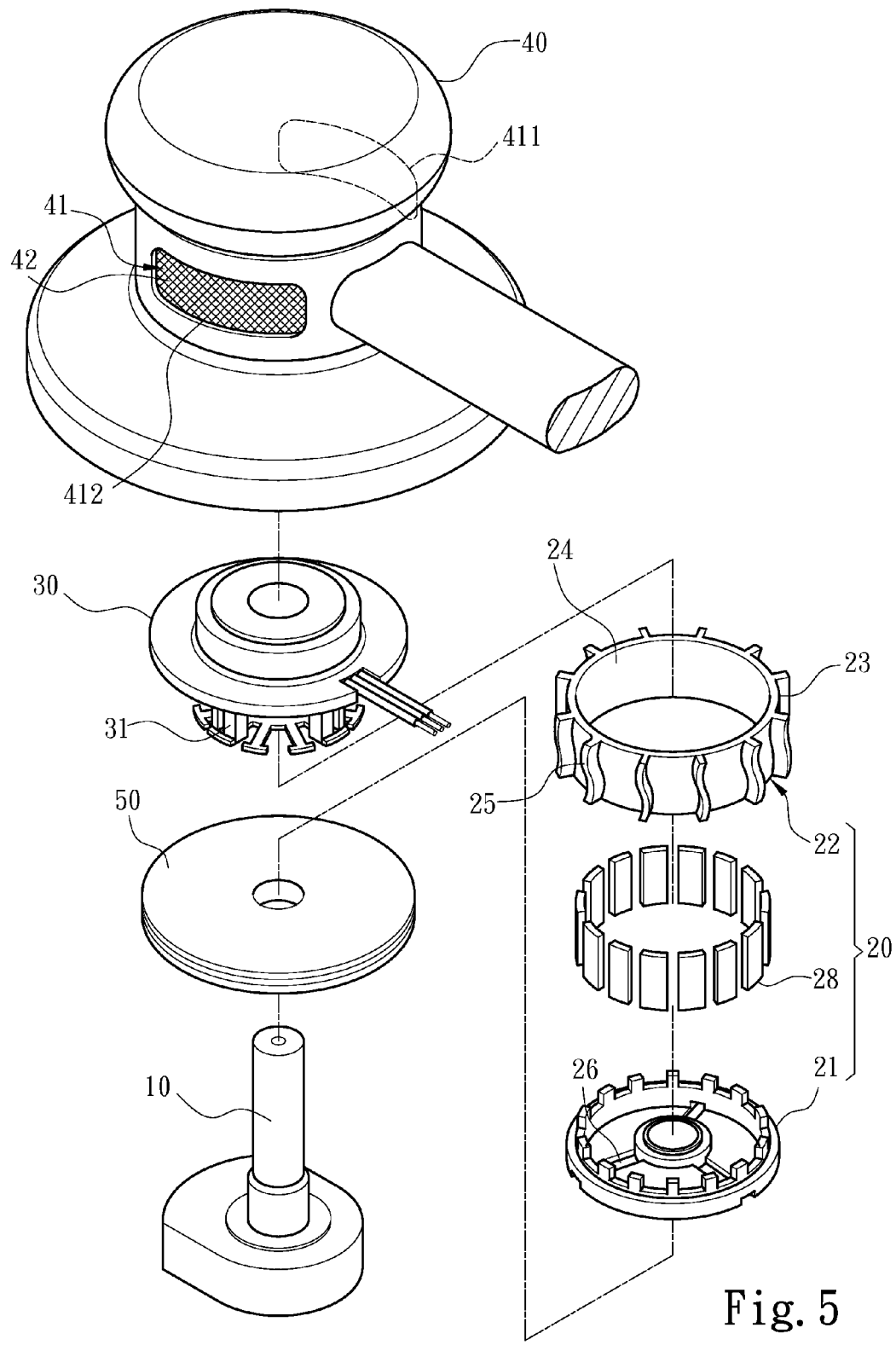
FIG. 5 is an exploded view of another embodiment of the invention.

Refer to FIG. 5 for another embodiment of the invention. The heat dissipation vent 41 may have a filter 42 located therein to prevent dust or external materials from entering the motor and affecting the lifetime of the machine tool. The flow directing portion 25, aside from positioning outside the outer peripheral surface 23 of the rotor 20 in the axial direction as shown in FIG. 1, may also be formed in a curved manner on the outer peripheral surface 23. In short, the flow directing portion 25 aims to direct airflow, and can be selected according to requirements, such as axial, curved or other arrangements to achieve an optimal flow directing efficiency. By means of the techniques discussed above, heat accumulated in the motor of the sealed machine tool can be discharged easily, and the lifetime and durability of the machine tool greatly enhanced.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A heat dissipation structure for sealed machine tools, comprising:
    a machine tool housing having a chamber and a wall which has a heat dissipation vent communicating with the chamber and the exterior;
    a stator located in the chamber; and
    a rotor located in the chamber between the stator and the housing;
    wherein the rotor and the wall of the housing form a swirling flow space therebetween, the rotor and the stator forming an axial flow space therebetween, the swirling flow space and the axial flow space being interposed by a radial airflow passage for communicating therewith, the rotor having an axial flow aperture communicating with the swirling flow space and the axial flow space, the rotor having at least one flow directing portion, the rotor rotating relative to the stator, the stator generating thermal airflow flowing radially from the axial flow space through the radial airflow passage to the swirling flow space, the flow directing portion discharging the thermal airflow through the heat dissipation vent to the exterior and directing external cooling airflow through the axial flow aperture into the axial flow space to form a circulating heat dissipation airflow.

2. The heat dissipation structure of claim 1, wherein the rotor has a base to form the axial flow aperture and an annular portion which holds magnetic elements to rotate relative to the stator.

3. The heat dissipation structure of claim 2, wherein the flow directing portion is axially located on an outer peripheral surface of the rotor.

4. The heat dissipation structure of claim 2, wherein the flow directing portion is located on an outer peripheral surface of the rotor in a curved manner.

5. The heat dissipation structure of claim 2, wherein the base of the rotor has an ancillary flow directing rib.

6. The heat dissipation structure of claim 5, wherein the flow directing portion is axially located on the outer peripheral surface of the rotor.

7. The heat dissipation structure of claim 5, wherein the flow directing portion is located on the outer peripheral surface of the rotor in a curved manner.

8. The heat dissipation structure of claim 2, wherein the base of the rotor is gradually shrunk in an inclined manner from the outer perimeter to the center.

9. The heat dissipation structure of claim 8, wherein the flow directing portion is axially located on the outer peripheral surface of the rotor.

10. The heat dissipation structure of claim 8, wherein the flow directing portion is located on the outer peripheral surface of the rotor in a curved manner.

11. The heat dissipation structure of claim 1, wherein the heat dissipation vent has an air inlet and an air outlet.

12. The heat dissipation structure of claim 11, wherein the heat dissipation vent has a filter.

13. The heat dissipation structure of claim 1, wherein the heat dissipation vent has a filter.

14. The heat dissipation structure of claim 1, wherein the stator and the rotor are coupled coaxially on a rotated shaft.

15. The heat dissipation structure of claim 14, wherein the rotated shaft has a distal end fastened to a tool set.

16. The heat dissipation structure of claim 1, wherein the machine tool housing has a locking ring to seal the chamber.

* * * * *